United States Patent

[11] 3,621,070

| | | | |
|---|---|---|---|
| [72] | Inventor | Stanley Rachlin<br>South Amboy, N.J. | |
| [21] | Appl. No. | 873,100 | |
| [22] | Filed | Oct. 31, 1969 | |
| [45] | Patented | Nov. 16, 1971 | |
| [73] | Assignee | International Flavors & Fragrances Inc.<br>New York, N.Y. | |

[54] PROCESS FOR PREPARING ISOCARYOPHYLLENE
6 Claims, No Drawings

[52] U.S. Cl. .................................................. 260/675.5,
252/439, 260/666 A
[51] Int. Cl. .................................................. C07c 5/00,
B01j 11/74, C09f 3/00

[50] Field of Search ............................................ 260/675.5

[56] References Cited
OTHER REFERENCES

Schulte-Elte et al. Helv. Chim. Acta 51(3) 494– 505 (1968).

*Primary Examiner*—Delbert E. Gantz
*Assistant Examiner*—G. E. Schmitkons
*Attorney*—Ward, McElhannon, Brooks & Fitzpatrick

ABSTRACT: A process for preparing isocaryophyllene by heating caryophyllene at a temperature of from about 120°–235° C in the presence of a suitable catalyst such as selenium, metal selenides which decompose to yield selenium, or sulfur. The catalyst may be supported or unsupported.

PROCESS FOR PREPARING ISOCARYOPHYLLENE

This invention has to do with an improved process of preparing isocaryophyllene. More specifically, this invention is concerned with preparing isocaryophyllene by the catalytic isomerization of caryophyllene.

Caryophyllene is a naturally occuring material found in oil of cloves, as obtained from the flower heads of *Eugenia Caryophyllata*. It is a sesquiterpene material which is also found in certain species of the genus *Pinus*. The structure of caryophyllene is shown by the following formula (I):

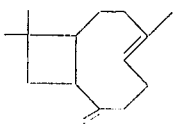

The isomer of caryophyllene, namely isocaryophyllene has been found to be useful as a precursor for the manufacture of various fragrance ingredients for perfume compositions. For example, in the copending U.S. application of James D. Grossman, Ser. No. 760,703, filed Sept. 19, 1968, dihydroisocaryophyllene epoxide also denominated 5,6-epoxy-2, cis 6,10,10-tetramethylbicyclo [7,2,0]-undecane, which has a woody fragrancelike note with a very desirable tobaccolike quality, is prepared by reacting isocaryophyllene with a peracid such as perphthalic acid or perbenzoic acid and the like. A further description of the use of said epoxide and its preparation can be found in the aforesaid Grossman application.

Isocaryophyllene, having the structure of the following formula: (II)

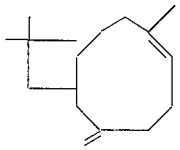

has previously been prepared by a number of techniques from caryophyllene. Thus, caryophyllene was converted to isocaryophyllene photochemically (Shulte–Elte et al., *Helv. Chim. Acta*, Vol. 51, Fasc. 3, pp. 494–505 (1968) or by treatment with nitrous oxide (*Annalin*, 1907, 356, 1). These prior procedures possess a number of disadvantages, including the serious factors that poor yields and conversions are obtained.

In accordance with the present invention, it has now been found that isocaryophyllene may be prepared from caryophyllene in improved yields and conversions by heating caryophyllene in the presence of a suitable catalyst such as metallic selenium, metal selenides which yield selenium under the conditions of the reaction, sulfur, and mixtures thereof.

Suitable catalysts are those capable of isomerizing caryophyllene to isocaryophyllene at elevated temperature. While any of the foregoing named materials may be used, selenium and selenium yielding catalysts are preferred. Selenium may be used in elemental form or metal selenides of selenium such as cadmium selenide, and bismuth selenide, which decompose at the reaction temperature to produce metallic selenium can be employed.

The catalyst may be in supported or unsupported form. Carriers or supports such as activated carbon, alumina, pumica, silica, diatomaceous earth, asbestos, Fuller's earth, and graphite may be used. Supported catalysts may be prepared by vapor depositing the catalyst on the carrier in an appropriate, e.g. nonoxidizing, atmosphere. Alternatively, the carrier may be impregnated with a solution or dispersion of the catalyst and the vehicle removed as by drying. Other methods of intimately admixing the catalyst with the carrier will readily occur to those skilled in the art. The catalyst may be subjected to various heat-treatments or sequences to activate it or extend its effective life. For example, where selenium is employed, supported catalyst is prepared by depositing selenium from selenium hydride in the carrier in an inert atmosphere, or a carrier (e.g. silica) may be impregnated with selenium dioxide in a solvent (e.g. ethyl alcohol), the solvent evaporated and the impregnated carrier heated with a reducing agent such as carbon monoxide, hydrogen, sodium thiosulfate or sodium dithionite at the decomposition of selenium dioxide (e.g. about 150° C.) to reduce the oxide to metallic selenium.

In carrying out the reaction the caryophyllene is brought in contact with the catalyst at an elevated temperature for a period of time sufficient to complete the conversion to isocaryophyllene. The reaction can be carried out in the liquid or vapor phase. Although various vehicles or solvents may be used it is preferred for purposes of recovering the isocaryophyllene not to use such vehicles or solvents.

The caryophyllene starting material may be in pure or impure form. Thus, it may be desirable or even preferable to employ the naturally occuring form of caryophyllene, such as clove oil.

The reaction temperature used will depend upon a number of factors including the particular catalyst and carrier employed, the form of the caryophyllene starting material, the duration of the reaction and conversions and yields considered acceptable. Generally, with selenium containing catalysts, temperatures of from about 120° C. to.230° C. may be used and a temperature range of from about 170°–185° C. is preferred. When sulfur is used as a catalyst, a preferred temperature range is from 175°–235° C. At these temperatures the conversion is substantially complete in a reasonable time of from 2 to 4 hours. At temperatures much above 230° C. volatilization of selenium and loss of the catalyst may occur and at temperatures much below 120° C. the conversion is inadequate or proceeds too slowly. At temperatures much above 235° C. undesirable side reactions or degradation of the caryophyllene may occur with sulfur as the catalyst.

Atmospheric, subatmospheric, or above-atmospheric pressures can be used although for reasons of convenience substantially atmospheric pressures are preferred.

The isocaryophyllene obtained can be readily recovered by conventional techniques. Where a vehicle is employed the isocaryophllene can be isolated by filtration or gravity separation. Where vehicles are used, distillation and fractional distillation procedures may be used.

The following examples are given to illustrate embodiments of the invention as it is presently preferred to practice it. It will be understood that these examples are illustrative, and the invention is not to be considered as restricted thereto except as indicated in the appended claims.

EXAMPLE 1

Into a two liter reaction flask equipped with a stirrer, reflux condenser and thermometer is placed 1.5 g. of selenium shot and 1,500 g. of clove oil terpenes. An inert atmosphere is preserved by use of a nitrogen blanket. The mixture is heated to 172° C. and held at about 175° C. for a period of approximately 3-¼ hours. After cooling, isocaryophyllene reaction product is siphoned off, being careful to leave all of the selenium behind in the reactor. A yield of 1,485 g. of isocaryophyllene is obtained.

In a similar manner caryophyllene can be converted to isocaryophyllene using suitable catalysts other than a selenium containing one.

EXAMPLE 2

Into a 250 ml. reaction flask equipped with a stirrer, reflux condenser, and thermometer is placed 100 grams of caryophyllene (caustic treated clove terpene) and 4 grams of sulfur. An inert atmosphere of nitrogen is maintained. The mixture is heated for 8 hours at 225° C. The product (100 grams) is distilled at 3 mm.Hg. at a temperature of 165° C. Three fractions are obtained weighing 74.5 grams. The residue weight is 27 grams. Upon purification a yield of 71.5 grams is isocaryophyllene is obtained.

What is claimed is:

1. A process for preparing isocaryophyllene which comprises heating caryophyllene at a temperature of from about 120° C. to 230° C. in the presence of a catalyst consisting essentially of selenium or sulfur, and recovering isocaryophyllene.

2. A process as defined in claim 1 wherein said catalyst is supported on a carrier.

3. A process as defined in claim 1 wherein said catalyst is metallic selenium.

4. A process as defined in claim 1 wherein said catalyst is sulfur.

5. A process as defined in claim 1 wherein said catalyst is metallic selenium and said temperature is within the range of about 170°–185° C.

6. A process as defined in claim 1, wherein the catalyst is sulfur and said temperature is within the range of 175° to 235° C.

* * * * *